United States Patent [19]

Sandler

[11] Patent Number: 4,904,739
[45] Date of Patent: Feb. 27, 1990

[54] POLY(FLUOROACETYLENE) CONTAINING POLYMERS

[75] Inventor: Stanley R. Sandler, Springfield, Pa.

[73] Assignee: Pennwalt Corporation, Philadelphia, Pa.

[21] Appl. No.: 202,655

[22] Filed: May 27, 1988

Related U.S. Application Data

[60] Continuation of Ser. No. 870,466, Jun. 4, 1986, abandoned, which is a division of Ser. No. 676,122, Nov. 29, 1984, Pat. No. 4,678,842.

[51] Int. Cl.$^4$ .................................................. C08F 8/00
[52] U.S. Cl. ................................. 525/326.4; 525/367; 525/369; 525/378; 525/379
[58] Field of Search .................................... 525/326.4

[56] References Cited

U.S. PATENT DOCUMENTS

| | | | |
|---|---|---|---|
| 2,857,366 | 10/1958 | Middleton | 260/92.1 |
| 3,051,677 | 8/1962 | Rexford | 260/29.6 |
| 3,252,954 | 5/1966 | Calfee et al. | 260/92.1 |
| 3,507,844 | 4/1970 | Wood | 260/87.7 |
| 4,595,706 | 6/1986 | Milligan et al. | 521/53 |

FOREIGN PATENT DOCUMENTS

| | | |
|---|---|---|
| 58-59208 | 4/1983 | Japan . |
| 1152208 | 5/1969 | United Kingdom . |

OTHER PUBLICATIONS

K. C. Metzger et al., "Theoretical Studies of the Electronic Properties of Substituted Polyacetylenes", *Polymer Preprints*, American Chemical Society, vol. 25, No. 1, pp. 195–196, Apr. 1984.
*Chemical and Engineering News*, Sep. 5, 1983, p. 26.
*Chemical Abstracts*, vol. 99, 140600q, 1983.
H. Kise et al., "Phase Transfer Catalysis in Dehydrofluorination of Poly(Vinylidene Fluoride) by Aqueous Sodium Hydroxide Solutions", *Journal of Polymer Science*, vol. 21, No. 12, pp. 3443–3451, Dec. 1983.
D. C. Thompson et al., "Elastomers", *Encyclopedia of Polymer Science and Technology*, vol. 14, pp. 610–617 (1971).
G. Moggi et al., "Synthesis and Properties of Some Hexafluoropropene-1,1-Difluoroethene Copolymers", *Polymer Bulletin*, vol. 7, pp. 115–122 (1982).
A. J. Dias et al., "Phase Transfer Catalyzed Polymer Surface Modification", *Proceedings of the ACS Division of Polymeric Materials Science and Engineering*, vol. 49, pp. 574–575 (1983).

*Primary Examiner*—Joseph L. Schofer
*Assistant Examiner*—Bernard Lipman
*Attorney, Agent, or Firm*—Bernard F. Plantz

[57] ABSTRACT

Compositions of poly(fluoroacetylene) useful for providing electrically conductive properties to plastics by a method of dehydrofluorination of saturated fluoroethylene polymers.

6 Claims, No Drawings

POLY(FLUOROACETYLENE) CONTAINING POLYMERS

This is a continuation of co-pending application Ser. No. 06/870,466 filed on Jun. 4, 1986, now abandoned, which was a divisional application of Ser. No. 06/676,122 filed on Nov. 29, 1984 (now U.S. Pat. No. 4,678,842 that issued July 7, 1987).

BACKGROUND OF THE INVENTION

Preparation of plastic materials of high stability with electrically conductive properties has been a major goal of the plastic and electronics industry for some time. Such a plastic product would, for example, revolutionize the battery powered electric motor industry, such as in the automotive field, by making light weight batteries of high storage capacity available. In such batteries the lead plates would be replaced with a relatively light weight plastic material, making long range electric powered automobiles a reality.

Such light weight plastics with electrical conductive properties would also be beneficial in solar to electrical conversion equipment and provide equipment of far lighter weight. Such plastics would find a myriad of uses in many varying types of electrical equipment or in components thereof.

The production of isolatable films of poly(fluoroacetylene) or poly(difluoroacetylene) by the basic dehydrofluorination of poly(vinylidene fluoride) or poly(trifluoroethylene) containing polymers has not been reported in the literature.

A number of experimentors have proposed such dehydrofluorination but have failed to achieve such dehydrofluorinated polymers. For examples, in a brief report by McCarthy and Dias [Chem. & Eng. News, Sept. 5, 1983, p. 26 and Preprints of the Division of Polymeric Materials Science and Engineering, 49, 574 (1983)] the authors speculated the poly(vinylidene fluoride) would undergo dehydrofluorination when treated with aqueous caustic using a phase transfer catalyst. The authors isolated a polymer containing ketone groups after treatment with aqueous sulfuric acid.

In U.S. Pat. No. 2,857,366 that issued Oct. 21, 1956 to Middleton, monofluoroacetylene was prepared by thermal decomposition of monofluoromaleic anhydride and monofluoroacetylene polymers prepared therefrom. Such a process is expensive, dangerous, and is limited to monofluoroacetylene.

In Japanese Patent Jpn Kohai Tokkyo Koho JP No. 58 59,208 [83 59,208] Apr. 3, 1983 by Mitsubishi Chemical Industries Co., Ltd. (Chem. Abstr. 99, 140600q 1983) poly(difluoroacetylene) was prepared by the polymerization of difluoroacetylene monomoer in tetrahydrofuran solution at 0° C.

The process of the present invention merely removes HF from a wide variety of existing, commercially available, fluorine substituted polymers in a relatively inexpensive treatment with a basic solution. No catalyst is required for the process to proceed at commercial rates, although such catalysts might be economically beneficial for some conversions.

BRIEF SUMMARY OF THE INVENTION

The product or composition of this invention is defined as a fluorine substituted, conjugated carbon-to-carbon double bond containing polymeric composition that imparts electrical conductivity to structures made therefrom, consisting essentially of (a) 0 to 95 monomeric mol percent of (i) vinylidene fluoride monomeric units or trifluoroethylene monomeric units, or (ii) a major portion of vinylidene fluoride monomeric units with at least one copolymerized monomeric unit selected from the group consisting essentially of trifluoroethylene, vinyl chloride, and vinyl fluoride monomeric units, and mixtures of (i) and (ii); and (b) 100 to 5 monomeric mol percent of the unit

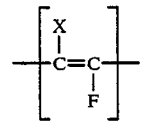

wherein X is H or F and the monomeric units of (b) are arranged to form conjugated double bonds, with the proviso that when a homopolymer of (a)(i) is present, the mol pecent in (b) is 95 to 5 and the mol percent in (a) is 5 to 95, to provide a polymeric composition that imparts electrical conductivity to articles prepared therefrom.

The preferred monomeric units in (a)(i) above are vinylidene fluoride or trifluoroethylene or both vinylidene fluoride and trifluoroethylene. It is preferred that the monomeric mol percent of the dehydrofluorinated unit in (a)(ii) above be at least 40. The product of the invention includes electrically conductive film and tubular structures, or other shapes, formed of the above polymeric compositions.

DETAILED DESCRIPTION OF THE INVENTION

The product of the invention is prepared by treating the appropriate commercially available, fluorine substituted polymer, in film or powder form, with a basic treatment solution (preferred pH of 10 to 14) that removes HF to such an extent that at least 5 monomeric mole percent of the treated polymer contains double bonds. The double bonds are conjugated, which means that at least 5 mole percent of the double bond containing units occur in pairs to provide a sequence of: single, double, single, double, single bonds, Other dehydrofluorinated units may occur, permissively, randomly throughout the polymer chain, but these units are not included in the threshold of 5%.

By way of illustration, equations I, II, and III below illustrate the process where full dehydrofluorination occurs. In I the starting polymer is poly(vinylidene fluoride) to provide poly(monofluoroacetylene) (PMFA); in II the starting polymer is poly(trifluoroethylene) to provide poly(difluoroacetylene) (PDFA); and in III the starting polymer is a copolymer of vinylidene fluoride and trifluoroethylene to provide poly(monofluoroacetylene, difluoroacetylene) copolymers.

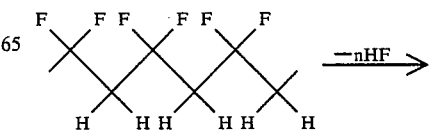

I

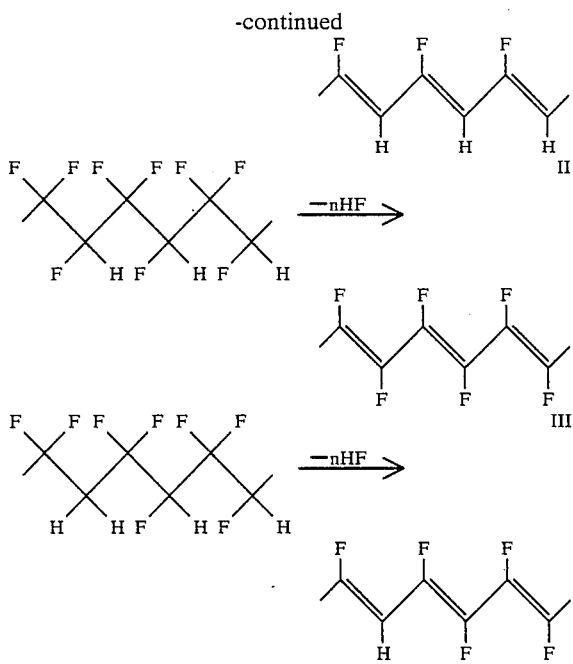

It is thus apparent, that the X substituents forming the adjacent pairs of dehydrofluorinated units

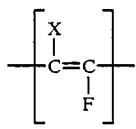

that form the conjugated double bonds, need not be the same. X can be H in one unit and F in the adjacent unit, or X could be the same in adjacent units. Moreover, the degree of dehydrofluorination can be such that from 5 to 100 monomeric mol percent of the polymer contains the dehydrofluorinated units that occur in pairs.

The polymeric composition of this invention may be prepared by the basic dehydrofluorination of poly(vinylidene fluoride) and poly(trifluoroethylene) and copolymers incorporating either or both of these polymers. The bases are derived either from alkali hydroxides or organic amines in aqueous or organic solvents at room temperatures (preferably 25° to 100° C. at pH of 10 to 14). The period of treatment is from about five minutes to 90 hours, or longer, Preferred solvents for the basic solution are those selected from water, dimethyl formamide, dimethyl acetamide, dimethyl sulfoxide, methanol, ethanol or butanol.

Typical bases that can be included in the basic solution are: sodium hydroxide, potassium hydroxide, lithium hydroxide, rubidium hydroxide, and either quaternary ammonium componds such as tetrabutylammonium hydroxide or tetrabutylammonium halides.

In some case the addition of a surfactant aids the rate of reaction.

Optionally aliphatic, heterocyclic or aromatic amines such as triethylamine, pyridine, quinoline and salts derived from them, can be used as the basic producing agent.

The following examples illustrate the invention and are not to be taken as a limitation thereof.

EXAMPLE 1

To a mixture of 45 ml of 10% alcoholic potassium hydroxide (prepared from 10 g KOH and 90 g of ethanol) and 10 ml of dimethyl acetamide (DMAC) as solvent at 25° C. was added 0.005 g of a piece of commercially available poly(vinylidene fluoride) film (Kynar ® 900 film, of about 0.003 in. thickness having about 2,400 monomer units, sold by Pennwalt Corporation under the Kynar trademark). After 90 hours at 25° C. the film turned brown and the solution was orange in color. The film was washed with water, dried and an infrared (IR) spectrum run on both the treated and untreated film. A comparison of the IR spectra show that significant amounts of poly(fluoroacetylene) was produced, as evidenced by the absorption bond at the 1595.7 wave number which is absent in the spectrum of the untreated poly(vinylidene fluoride) film.

EXAMPLE 2

12.8 of a commercially available powdered poly(vinylidene fluoride) homopolymer (Kynar ® 901, sold by Pennwalt Corporation) was dissolved in 150 ml of DMAC and added to a solution of 11.2 KOH in 100 ml $CH_3OH$, to provide a gel. The gel was washed with water and dried at 100° C. overnight to provide 9.5 g of product. The product was not soluble in DMAC, methyl isobutyl ketone (MIBK), or NaOH solution, and had a melting point in excess of 300° C. The IR spectra for the product showed an absorption band at about 1600 wave number [corresponding to poly(difluoroacetylene) units] which was absent with the starting polymer.

The C, H, and F analysis in weight percent was:

|  | C | H | F |
| --- | --- | --- | --- |
| Starting Polymer | 38.8 | 3.00 | 59.10 |
| Final Product | 48.6 | 3.16 | 38.60 | which also shows significant elmination of HF to provide the conjugated double bonds in the product (monomeric mole percent about 100 would be equal to a polymer with 43% fluorine).

EXAMPLE 3

3.0 g of a commercially available poly(vinylidene fluoride) powder (sold under Kynar ® trademark of Pennwalt Corporation) was dissolved in 100 ml DMAC and then the solution added to 21 g of 1,8-diazabicyclo[5,4,0]undec-7-ene. After 3 to 4 minutes the solution turned black. The next day the black solid was filtered, washed and dried at 110° C. to provide 2.6 g of product. The product did not show any melt flow behavior and exhibited an IR absorption at a wave number of about 1600, indicating the presence of poly(difluoroacetylene) units. The C, H, and F analysis in weight percent was:

|  | C | H | F |
| --- | --- | --- | --- |
| Starting Polymer | 38.8 | 3.00 | 59.10 |
| Final Product | 39.8 | 3.44 | 54.20 | which indicates elimination of a substantial amount of HF to form the conjugated double bonds (approximately 30 mol % dehydrofluorination).

EXAMPLE 4

To a flask containing a solution of 4 g (0.1 mole) of sodium hydroxide in 20 ml of water and the mixture stirred magnetically at 70° C., for a few minutes. Then 1.0 g of poly(trifluoroethylene) film was added (softening point of 200°–202° C.). The flask was sealed with a stopper and the mixture stirred at 70° C. for five hours. The polymer turned dark brown and the solution was amber colored. The polymer film was rinsed with water and dried at room temperature for three days. In infrared spectrum of the film (attenuated total reflectance) shows that poly(difluoroacetylene) was produced as evidenced by absorption at the 1618.9 wave number which is absent in the control (before reaction) film.

EXAMPLE 5

This example illustrates severe over dehydrofluorination of the commercially available polyvinylidene fluoride powder of Example 2.

1.5 g of the Kynar ® powder in 50 ml of DMAC was added to 10.7 g of 96% 1,8 diazabicyclo [5,4,0]undec-7-ene, then heated at reflux for 3 hours and allowed to remain at room temperature. The resulting polymer product obtained by filtration was then washed with water and dried.

The final product analysis of C, H, and F (weight %) was:

|                  | C    | H    | F     |
|------------------|------|------|-------|
| Starting Polymer | 38.8 | 3.00 | 59.10 |
| Final Product    | 67.6 | 5.52 | 7.68  | which indicates severe over dehydrofluorination as the final F % is 7.68, whereas at 100 mol percent of the conjugated double bond containing monomeric unit, the % F should be about 43%.

EXAMPLE 6

To a stainless steel pressure vessel was added 1.0 g of poly(vinylidene fluoride) powder and 10 ml of triethylamine. The temperature was raised to 110°–155° C. (20–60 psig) and held there for 7 hours. The vessel was cooled, opened and the solid polymer washed with water. After drying at 110° C. the polymer had an analysis of C, H, and F as follows:

|                  | C    | H    | F     |
|------------------|------|------|-------|
| Starting Polymer | 38.8 | 3.00 | 59.10 |
| Final Product    | 41.7 | 3.08 | 53.00 |

This corresponds to about 37.5% dehydrofluorination.

EXAMPLE 7

To a flask containing the caustic solution described in Example 4 is added 1.0 g of poly(vinylidene fluoride/trifluoroethylene) copolymer (22.8% trifluoroethylene content) and reacted as in Example 4. The infrared spectrum of the dried film indicates that dehydrofluorination took place to a polyacetylene structure as indicated in the absorption at about 1609 wave number.

I claim:

1. A fluorine substituted, conjugated double bond polymer possessing electrical conductivity, consisting essentially of a polymer containing
   (a) 5 to 95 mol percent of monomeric units of vinylidene fluoride or trifluoroethylene; and
   (b) 95 to 5 mol percent of the monomeric units

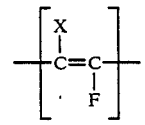

said units being derived from a polymer selected from the group consisting of poly(vinylidene fluoride), and poly(trifluoroethylene), wherein X is H or F and the monomeric units of (b) are arranged to form conjugated double bonds.

2. The polymeric composition as described in claim 1 wherein the units in (a)(i) are vinylidene fluoride.

3. The polymeric composition as described in claim 1 wherein the units in (a)(i) are trifluoroethylene.

4. The polymeric compositions as defined in claim 1 wherein in (b) the monomeric mol percent is at least 40.

5. An electrically conductive film formed of the polymeric composition of any one of claims 1, 2, 3 or 4.

6. An electrically conductive tubular structure formed of the polymer of any one of claims 1, 2, 3 or 4.

* * * * *